UNITED STATES PATENT OFFICE.

AUGUST BERNTHSEN, OF HEIDELBERG, BADEN, ASSIGNOR TO BADISCHE ANILIN AND SODA FABRIK, OF MANNHEIM, GERMANY.

MANUFACTURE OF COLORING-MATTERS.

SPECIFICATION forming part of Letters Patent No. 282,836, dated August 7, 1883.

Application filed July 12, 1883. (No specimens.)

*To all whom it may concern:*

Be it known that I, AUGUST BERNTHSEN, a subject of the Grand Duke of Baden, residing at Heidelberg, in the Grand Duchy of Baden and Empire of Germany, have invented new and useful improvements in the manufacture of coloring-matters or dye-stuffs containing sulphur as an essential element of their constitution, of which the following is a specification.

This invention relates to the production of a purple coloring-matter or dye-stuff from thiodiphenylamine—a new sulphureted derivative of diphenylamine described and claimed in a separate application for Letters Patent bearing even date with this, and which may be prepared by heating diphenylamine with sulphur.

In carrying out this invention I take the said thiodiphenylamine and convert the same into a nitro compound, which, by subsequent treatment with reducing agents, is changed into a colorless compound, from which, by oxidation, a purple coloring-matter or dye-stuff may be readily obtained. As an example, I proceed as follows: About one part by weight of thiodiphenylamine (finely powdered) is added, in very small portions at a time, to about five parts (by weight) of nitric acid of about 1.38 specific gravity, and care is taken to keep the mixture agitated and well cooled, so as to prevent any rise of the temperature above 15° centigrade. The mixture thus obtained is then carefully diluted with about one hundred parts of cold water, and the resulting precipitate of the nitro compound is separated from the acid liquor by filtration or decantation. As an example of the manner in which the said nitro compound of thiodiphenylamine may be converted into the above-mentioned colorless compound by treatment with reducing agents, I digest about two parts (by weight) of the said nitro compound with about six parts (by weight) of granulated tin, about fourteen parts (by weight) of strong hydrochloric acid of about 1.18 specific gravity, and about ten parts of water, in a manner well known to chemists, and the mixture is heated until a solution has been obtained containing the hydrochlorate of the new leuco base thus produced. I then add zinc in sufficient quantity to precipitate the tin which has entered into solution, and the filtered liquor may at once be oxidized by being mixed with a cold and dilute solution of perchloride of iron in slight excess, whereby a dark purple precipitate of the coloring-matter is produced, which may then be separated from the mother-liquor by filtering and pressing. A further purification of the dye-stuff may be effected by dissolving the same in water and adding hydrochloric acid in sufficient quantity to throw down a crystalline precipitate, which may then be filtered and dried.

Some of the charateristic properties of the purple coloring-matter or dye-stuff are as follows: In the dry state it is a dark-brown crystalline powder possessing a green metallic luster. When strongly heated in a test-tube, it gets decomposed under evolution of sulphureted hydrogen. It dissolves in water with a bright purple color. Upon the addition of caustic alkalies the purple-colored aqueous solution turns red, a precipitate of the color base being produced, which dissolves in ether with a yellowish-red color. The dye-stuff dissolves in concentrated sulphuric acid with a green coloration, which, upon the gradual addition of water, first turns blue and then purple. Reducing agents—such as a mixture of tin or zinc dust with hydrochloric acid—quickly decolorize the aqueous solution of the dye-stuff, and the colorless compound thus produced turns again purple by the addition of oxidizing agents, such as perchloride of iron. The purple coloring-matter dyes cotton which has been previously mordanted with tannin, and it becomes fixed upon animal fiber without the aid of a mordant.

What I claim as new, and desire to secure by Letters Patent, is—

As a new article of manufacture, the purple dye-stuff or coloring-matter produced from thiodiphenylamine and having the characteristics above set forth.

In testimony whereof I have hereunto set my hand in the presence of two subscribing witnesses.

AUGUST BERNTHSEN.

Witnesses:
E. CHANDLER,
JOHANNES BÜTTNER.